3,701,775
ESTERS OF MANDELOYLAMINOCEPHALO-SPORANIC ACIDS

David A. Berges, Plymouth Meeting, George L. Dunn, Wayne, and John R. E. Hoover, Glenside, Pa., assignors to Smith Kline & French Laboratories, Philadelphia, Pa.
No Drawing. Filed Nov. 25, 1970, Ser. No. 92,860
Int. Cl. C07d 99/24
U.S. Cl. 260—243 C    22 Claims

---

ABSTRACT OF THE DISCLOSURE

Esters of mandelamidocephalosporanic acids having antibacterial activity are prepared by condensing the mandelamidocephalosporin with a carboxylic acid. Preferred compounds include those where the carboxylic acid is an amino acid.

---

This invention relates to chemical compounds having antibacterial activity. In particular, the invention relates to esters of 7-mandeloylaminocephalosporanic acid and derivatives thereof.

The compounds of the invention may be represented by the following structural formula:

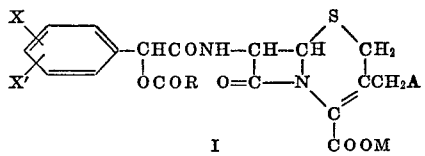

wherein:

X and X' are each hydrogen, lower alkyl of 1–4 carbon atoms, lower alkoxy of 1–4 carbon atoms, halo, trifluoromethyl, nitro, or dilower alkylamino of 2–8 carbon atoms;
A is hydrogen, lower alkanoyloxy of 2–8 carbon atoms, pyridinium, lower alkoxy of 1–4 carbon atoms, lower alkylthio of 1–4 carbon atoms, or, when taken together with M, a carbon-oxygen bond;
M is hydrogen, a pharmaceutically acceptable cation, an anionic charge, or, when taken together with A, a carbon-oxygen bond; and
R is aminoalkyl of 1 to 8 carbon atoms where said alkyl group may be branched or straight chain and may be unsubstituted or substituted with one or more hydroxy, mercapto, methylthio, carboxy, amino, or phenyl groups;
substituted alkyl where said alkyl group may have 1 to 8 carbon atoms and be branched or straight chain and the substituent may be lower alkoxy of 1–4 carbon atoms, hydroxy, allyloxy, lower alkylthio of 1–4 carbon atoms, azido, halo, cyano, carboxy, carbalkoxy where said alkoxy has 1–4 carbon atoms, or phenoxy;
carbocyclic aryl which may be unsubstituted or substituted with lower alkyl or alkoxy of 1–4 carbon atoms, halo, nitro, trifluoromethyl, hydroxy, amino, cyano, or dilower alkylamino of 2–8 carbon atoms;
heterocyclic aryl which may be unsubstituted or substituted with methyl;
carbocyclic aralkyl where the said alkyl group may be of 1–4 carbon atoms;
heterocyclic aralkyl where the said alkyl group may be of 1–4 carbon atoms; or
carbocyclic aryloxyalkyl where the said alkyl group may be of 1–4 carbon atoms.

Also part of the invention are certain derivatives of compounds of Formula I where R is aminoalkyl or amino substituted alkyl. These derivatives have the Formula II.

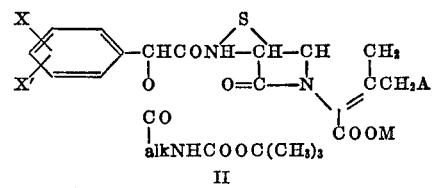

wherein:

X, X', A, and M are as defined above, and
Alk is a straight or branched chain alkyl group which may be substituted with one or more hydroxy, mercapto, methylthio, carboxy, amino, or phenyl groups.

These tert-butoxycarbonyl derivatives of the amines are intermediates for preparing the amino compounds of Formula I and also possess antibacterial activity themselves.

The term heterocyclic aryl, when used herein to describe compounds of the invention, is intended to include, but not limited to, 2, 3, and 4-pyridyl, 2 and 3-thienyl, 2 and 3-furyl, thiazolyl, isothiazolyl, oxazolyl, triazolyl, thiadiazolyl, and sydnone. Other groups generally understood by medicinal chemists to be within the definition of heterocyclic aryl are also included.

Among the pharmaceutically acceptable cations intended to be included within the definition of M are the alkali metal ions such as sodium and potassium, ammonium, and organic amines such as triethylammonium, procaine, and N-ethylpiperidinium.

The products of the present invention are antibacterial agents, having activity against Gram-positive and Gram-negative bacteria. Among the microorganisms against which they are effective are Staph. aureus, E. coli, Klebsiella pneumoniae, Strep. faecalis, and Strep. pyogenes. They are formulated for use and used to treat and prevent bacterial infections in the same manner as other cephalosporins and penicillins currently used in medical practice.

The compounds of Formula I are generally prepared by reacting a mandelamidocephalosporin of Formula III

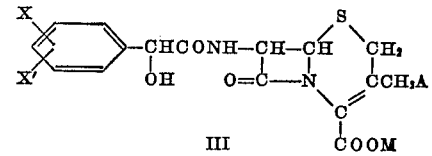

where X, X', A, and M are as defined above, with a compound of the formula RCOOH, where R is as defined above. The starting mandelamidocephalosporin compounds of Formula III are described in U.S. Pat. 3,167,-549. The ester formation may be conducted in any manner known to the art, providing it does not adversely affect the remaining parts of the compound. A preferred method involves reaction generally at room temperature in a suitable solvent such as tetrahydrofuran, dioxane, ethyl acetate, chloroform, dimethylformamide or methylene chloride between the mandelamidocephalosporin as the free acid or an alkali metal salt thereof, and the appropriate carboxylic acid, activated by prior reaction with a coupling reagent such as N,N'-carbonyldiimidazole or dicyclohexylcarbodiimide. Completion of the reaction, which requires an amount of time varying from about 4 to 100 hours, is determined by thin layer chromatography. Use of higher temperatures greatly accelerates the reaction, but care must be taken to avoid product decomposition. The resulting cephalosporin is isolated as the alkali metal or imidazole salt or it can be converted to the free acid by known methods including dissolving in a suitable solvent and stirring with an acidic ion exchange resin such as Amberlite IR–120H.

In order to perform the above-described reaction optionally, when R is an amino-containing group, it is desirable to protect the amino group with a group such as tert-butoxycarbonyl. The reactant with the mandelamidocephalosporin will thus be a compound of the formula RCOOH, in which the amino group of the R group is protected with a tert-butoxycarbonyl group and the carboxy group has been activated by reaction with carbonyldiimidazole. The resulting product, after removal of the imidazole by ion exchange treatment, is a tert-butoxycarbonyl compound of Formula II. These compounds are antibacterial agents. They are also converted to the corresponding amino compounds by careful treatment with an acid such as trifluoroacetic acid. Neutralization of the resulting trifluoroacetate salt gives a compound of Formula I. Other protective groups that may be used instead of tert-butoxycarbonyl are carbobenzyloxy and trichloroethoxycarbonyl.

Compounds of Formula I are also prepared by reacting an already substituted mandelic acid compound of Formula IV, where X, X', and R are as defined

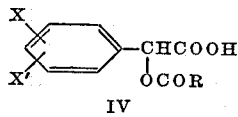

IV above, with 7-aminocephalosporanic acid, 7-aminodesacetoxycephalosporanic acid, or other similar 7-aminocephalosporanic acid compounds. Procedures for accomplishing this condensation are well-known to the art and include reaction of the acid chloride of the substituted mandelic acid in the presence of a base, or reaction of the substituted mandelic acid itself activated by a coupling agent such as N,N'-carbonyldiimidazole or dicyclohexylcarbodiimide. Compounds where R is aminoalkyl can be prepared through the corresponding azidoalkyl compounds, the azide group being catalytically reduced to amino following reaction of the mandelic acid with the cephalosporin nucleus.

Compounds in which A is hydroxy are prepared by preferential 7-acylation of the 7-amino-3-desacetylcephalosporanic acid.

Compounds in which A is lower alkanoyloxy are prepared by acylating the 7-amino group of compounds bearing the appropriate alkanoyloxy group.

Compounds in which A is pyridinium are prepared by converting a mandelamidocephalosporanic acid to the corresponding 3-pyridinium compound by known methods and then esterifying the mandelic portion of the molecule.

Compounds with other substituents at the 3-positions are prepared by esterifying the mandelic acid portion of a suitably substituted mandelamidocephalosporin compound.

Some of the compounds of the present invention are most conveniently isolated and purified as hydrates or partial hydrates. Said compounds may be obtained in anhydrous form by subjecting them to conventional dehydration techniques, e.g. by heat plus vacuum or by azeotroping off the water with benzene.

All of the compounds of the invention, by having one or more asymmetric carbon atoms, exist in the form of optical isomers. Both the D and the L-isomers, as well as racemic mixtures thereof, are included within the scope of the invention. The configuration of the starting material will determine the configuration of the product.

The following examples illustrate the preparation of the compounds of the invention, but are not to be construed as limiting the scope thereof. Temperatures are stated in degrees centigrade, unless otherwise noted.

EXAMPLE 1

7-(O-azidoacetyl-D-mandelamido)cephalosporanic acid

In a 100 ml. round bottom flask equipped with a reflux condenser, a calcium sulfate drying tube and magnetic stirring were heated 14.7 g. (0.0967 mole) D-mandelic acid and 34.7 g. azidoacetyl chloride at 80° for 2 hr. Excess azidoacetyl chloride was removed by vacuum distillation. The distillation residue was poured onto ice (ca. 100 g.) and stirred for 1.5 hr. Chloroform (100 ml.) was added, and the organic layer was separated, washed with water and dried over anhydrous sodium sulfate. The solution was passed through a Florisil column (200 g.) eluting successively with chloroform, ethyl acetate and ethanol. All fractions exhibiting a single spot on thin-layer chromatography were combined and stripped to dryness under vacuum to give 20.4 g. of an orange foam which was the magnesium salt of the desired product. The foam was dissolved in 75 ml. of water, covered with ether and acidified with 3 N hydrochloric acid until the aqueous phase produced no more cloudiness. The aqueous phase was extracted with ether, and the combined ether fractions were washed with water and dried over anhydrous sodium sulfate. Removal of the ether under vacuum left 17.5 g. (77%) of O-azidoacetyl-D-mandelic acid as a light orange oil which solidified on standing under refrigeration. The product was characterized as its cyclohexylamine salt.

$C_{16}H_{22}N_4O_4$ (334.384)

| | Theory | Found |
|---|---|---|
| C | 57.47 | 57.67 |
| H | 6.63 | 6.72 |
| N | 16.76 | 16.40 |

A solution of 7.05 g. (0.030 mole) O-azidoacetyl-D-mandelic acid in 10 ml. thionyl chloride was heated at reflux for 2 hours in a round bottom flask equipped with a reflux condenser and magnetic stirring. Gases exiting through the condenser were entrained in a large volume of water. Excess thionyl chloride was removed by vacuum distillation. The distillation residue (7.47 g., 98%), an orange oil, had spectral properties in accord with highly pure O-azidoacetyl-D-mandeloyl chloride.

To a suspension of 13.6 g. (0.050 mole) 7-aminocephalosporanic acid in 250 ml. dry chloroform at 0° in a 500 ml. round bottom flask equipped with magnetic stirring were added 14.0 ml. dry triethylamine. When dissolution was complete, the temperature was dropped to −7°, and 12.8 g. (0.0505 mole) O-azidoacetyl-D-mandeloyl chloride in 100 ml. dry chloroform were added over 1.25 hr. by means of a pressure-equalizing dropping funnel. Stirring was continued at 0° for 0.5 hr., and then the reaction mixture was allowed to warm to room temperature over 0.75 hr., and then 150 ml. of water were added and the pH was lowered to 2 by addition of 3 N hydrochloric acid. The resulting precipitate was collected by filtration and discarded. The layers were separated, and the aqueous phase was extracted with chloroform. The combined chloroform layers were washed with pH 2 hydrochloric acid solution and dried over anhydrous sodium sulfate. The resulting solution was stirred for 0.25 hr. with ca. 50 g. Amberlite IR-120H ion-exchange resin. The resin was removed by filtration, and the resulting solution was dried over anhydrous sodium sulfate and stripped under vacuum to give 21.5 g. of a tan foam. The foam was dissolved in ethyl acetate and 5.4 g. of triethylamine were added with ice cooling. Scratching and cooling gave 14.5 of triethylamine salt. Decolorization with Norit A and recrystallization from ethyl acetate gave 11.9 g. (40%) of analytically pure 7-(O-azidoacetyl-D-mandelamido)cephalosporanic acid, triethylamine salt, hemihydrate.

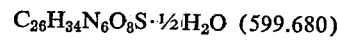

$C_{26}H_{34}N_6O_8S \cdot \frac{1}{2}H_2O$ (599.680)

| | Theory | Found |
|---|---|---|
| C | 52.07 | 51.94 |
| H | 5.88 | 5.85 |
| N | 14.01 | 14.05 |

EXAMPLE 2

7-(O-glycyl-D-mandelamido)cephalosporanic acid

To a prereduced suspension of 8.0 g. of 5% palladium on barium sulfate in 100 ml. methanol were added 3.27 g. (0.00668 mole) 7-(O-azidoacetyl-D-mandelamido)cephalosporanic acid and 11.4 ml. of a 5% solution of concentrated hydrochloric acid in methanol. The suspension was shaken at 62 p.s.i. hydrogen pressure for 1.5 hr., and then the catalyst was filtered off and washed with methanol. The combined methanol fractions were stripped to dryness to give 3.26 g. of crude hydrochloride. The hydrochloride was dissolved in a minimal amount of pH 2 hydrochloric acid solution, and an insoluble yellow solid was removed by filtration and discarded. The filtrate was stirred in the cold for 1 hr. with 70 ml. 25% Amberlite LA-1 (acetate form) ion-exchange resin in methyl isobutyl ketone, and the resulting solid collected and washed with methyl isobutyl ketone and then ether to give 2.10 g. (68%) analytically pure 7-(O-glycyl-D-mandelamido)cephalosporanic acid.

$C_{20}H_{21}N_3O_8S$ (463.478)

|   | Theory | Found |
|---|--------|-------|
| C | 51.83  | 51.87 |
| H | 4.57   | 4.89  |
| N | 9.07   | 9.30  |

EXAMPLE 3

7-(tert-butoxycarbonyl-O-L-methionyl-D-mandelamido)cephalosporanic acid

To a 250 ml. round bottom flask equipped with a calcium sulfate drying tube and magnetic stirring and containing 3.44 g. (0.0138 mole) tert-butoxycarbonyl-L-methionine in 25 ml. dry tetrahydrofuran were added 2.24 g. (0.0138 mole) N,N'-carbonyldiimidazole in one portion as a solid. The reaction was vigorous and rapid. Stirring was continued for 30 min., and then 5.08 g. (0.0125 mole) 7-(D-mandelamido)cephalosporanic acid in 75 ml. dry tetrahydrofuran were added in one portion. The resulting insoluble gum completely dissolved after stirring for 2 hr. The reaction's progress was monitored by thin-layer chromatography using fluorescent silica gel plates and an 80% chloroform–20% methanol solvent system. The reaction was complete after 18 hr., and the dark brown solution was stripped of solvent under vacuum. The residue was dissolved in ethyl acetate. Crystals separated upon standing and were collected by filtration to give 7.5 g. of the crude imidazole salt of 7-(tert-butoxycarbonyl - L - methionyl-D-mandelamido)cephalosporanic acid. This solid was dissolved in 100 ml. of a 50:50 mixture of methanol and acetone and stirred with excess Amberlite IR–120H ion-exchange resin (previously washed with methanol) for 0.5 hr. to remove the imidazole. The resin was removed by filtration, and the resulting filtrate was stripped to an orange foam under vacuum. The foam was agitated with a large excess of ether, and the resulting solution was filtered to remove insoluble impurities. The ether filtrate was concentrated and stored under refrigeration for 8 days after which time colorless crystals had formed and were collected by filtration to give 3.95 g. (50%) of pure 7-(tert-butoxycarbonyl-O-L-methionyl-D-mandelamido)cephalosporanic acid.

$C_{28}H_{35}N_3O_{10}S_2$ (637.744)

|   | Theory | Found |
|---|--------|-------|
| C | 52.74  | 52.79 |
| H | 5.53   | 5.59  |
| N | 6.59   | 6.27  |

EXAMPLE 4

7-(tert-butoxycarbonyl-O-D-alanyl-D-mandelamido)cephalosporanic acid

Example 3 was followed utilizing 2.08 g. (0.011 mole) tert-butoxycarbonyl-D-alanine and 1.79 g. (0.011 mole) N,N'-carbonyldiimidazole in 50 ml. dry p-dioxane. After 1 hr. 4.06 g. (0.010 mole) 7-(D-mandelamido)cephalosporanic acid in a minimum volume of p-dioxane were added. After about 45 hrs. the reaction mixture was poured into 650 ml. of anhydrous ether and 6.08 g. of solid collected. The acid was freed of imidazole leaving 4.5 g. of a foam which was extracted repeatedly with hot ether. The combined extracts were concentrated to 400 ml., and 600 ml. of pentane were added to precipitate 4.00 g. (69%) of 7-(tert-butoxycarbonyl-O-D-alanyl-D-mandelamido)cephalosporanic acid.

EXAMPLE 5

7-(tert-butoxycarbonyl-O-L-alanyl-D-mandelamido)cephalosporanic acid

Example 3 was followed utilizing 2.08 g. (0.011 mole) tert-butoxycarbonyl-L-alanine and 1.79 g. (0.011 mole) N,N'-carbonyldiimidazole in 25 ml. dry tetrahydrofuran. 7-(D-mandelamido)cephalosporanic acid (4.06 g., 0.010 mole) in 13 ml. ethyl acetate was added after 0.75 hr. As the reaction proceeded solid imidazole salt precipitated, and it was necessary to add 50 ml. tetrahydrofuran to facilitate stirring. The reaction was complete after ca. 24 hr. The crude salt (5.60 g.) was collected, and the acid freed of imidazole leaving a foam which was triturated with 1:1 ether-pentane to give 4.18 g. (72%) 7-(tert-butoxycarbonyl - O-L-alanyl-D-mandelamido)cephalosporanic acid which was characterized as its sodium salt.

$C_{26}H_{30}N_3NaO_{10}S$ (599.607)

|   | Theory | Found |
|---|--------|-------|
| C | 52.08  | 52.04 |
| H | 5.04   | 5.28  |
| N | 7.01   | 6.80  |

EXAMPLE 6

7-(tert-butoxycarbonyl-O-D-phenylalanyl-D-mandelamido)cephalosporanic acid

Example 3 was followed utilizing 3.66 g. (0.0135 mole) tert-butoxycarbonyl-D-phenylalanine and 2.24 (0.0138 mole) N,N'-carbonyldiimidazole in 50 ml. dry tetrahydrofuran. After 1 hr. 5.08 g. (0.0125 mole) 7-(D-mandelamido)cephalosporanic acid in 50 ml. tetrahydrofuran were added. After 23 hr. ethyl acetate was added and a gel collected. The gel was suspended in cyclohexane which caused it to change into a solid (8.47 g.). The acid was freed of imidazole leaving a gum which was dissolved in ether. Insoluble material was discarded. Pentane was added to the ether solution to precipitate 5.97 g. (73%) 7 - (tert - butoxycarbonyl-O-D-phenylalanyl-D-mandelamido)cephalosporanic acid. An analytical sample was prepared by crystallization from ether.

$C_{32}H_{35}N_3O_{10}S$ (653.722)

|   | Theory | Found |
|---|--------|-------|
| C | 58.80  | 58.36 |
| H | 5.40   | 5.40  |
| N | 6.43   | 6.13  |

EXAMPLE 7

7-(tert-butoxycarbonyl-O-L-phenylalanyl-D-mandelamido)cephalosporanic acid

Example 3 was followed utilizing 3.66 g. (0.0138 mole) tert-butoxycarbonyl-L-phenylalanine and 2.24 g. (0.0135 mole) N,N'-carbonyldiimidazole in 50 ml. dry tetrahydrofuran. After 0.75 hr. 5.08 g. (0.0125 mole) 7-(D-mandelamido)cephalosporanic acid in 20 ml. tetrahydrofuran were added. After 23 hr. the reaction mixture was diluted with ethyl acetate to precipitate the imidazole salt (6.81 g.). The acid was freed of imidazole leaving a gum most of which dissolved in ether. Insoluble material was discarded. Pentane was added to the cold ether solution to precipitate 5.68 g. (69%) of pure 7-(tert-butoxycarbonyl- O-L-phenylalanyl-D-mandelamido)cephalosporanic acid hemihydrate.

$C_{32}H_{35}N_3O_{10}S \cdot \tfrac{1}{2}H_2O$ (662.730)

|   | Theory | Found |
|---|---|---|
| C | 58.00 | 58.29 |
| H | 5.48  | 5.39  |
| N | 6.34  | 6.04  |

EXAMPLE 8

7-(tert-butoxycarbonyl-O-D-phenylglycyl-D-mandelamido)cephalosporanic acid

Example 3 was followed utilizing 5.52 g. (0.022 mole) tert-butoxycarbonyl-D-phenylglycine and 4.64 g. (0.029 mole) N,N'-carbonyldiimidazole in 100 ml. dry tetrahydrofuran. After 0.75 hr. 8.64 g. (0.021 mole) 7-(D-mandelamido)cephalosporanic acid in 100 ml. tetrahydrofuran were added. After 24 hr. 100 ml. of ethyl acetate and 200 ml. of cyclohexane were added to give a gelatinous precipitate. The gel was then stirred with ethyl acetate and cyclohexane to give a solid (13.6 g.). The acid was freed of imidazole, and the resulting gum was stirred with a large excess of ether. Insoluble material was discarded. The ether solution was concentrated and allowed to stand at room temperature until crystallization began. Filtration gave 3.23 g. (24%) of 7-(tert-butoxycarbonyl-O-D-phenylglycyl-D-mandelamido)cephalosporanic acid as a heavy solid. The filtrate gave on concentration and cooling a light fluffy solid (0.68 g., 5%) identified as 7-(tert-butoxycarbonyl - O - L-phenylglycyl-D-mandelamido)cephalosporanic acid.

$D\text{-}C_{31}H_{33}N_3O_{10}S$ (639.695)

|   | Theory | Found |
|---|---|---|
| C | 58.20 | 57.90 |
| H | 5.21  | 5.23  |
| N | 6.56  | 6.23  |

$L\text{-}C_{31}H_{33}N_3O_{10}S$ (639.695)

|   | Theory | Found |
|---|---|---|
| C | 58.20 | 58.14 |
| H | 5.21  | 5.24  |
| N | 6.56  | 6.34  |

EXAMPLE 9

7-(tert-butoxycarbonyl-O-L-phenylglycyl-D-mandelamido)cephalosporanic acid

Example 3 was followed utilizing 5.52 g. (0.022 mole) tert-butoxycarbonyl-L-phenylglycine and 4.64 g. (0.029 mole) N,N'-carbonyldiimidazole in 50 ml. dry tetrahydrofuran. After 0.5 hr. 8.12 g. (0.020 mole) 7-(D-mandelamido)cephalosporanic acid in 100 ml. tetrahydrofuran were added. After 10 hr. 300 ml. cyclohexane were added to precipitate a solid which was then dissolved in a small amount of methanol, and ethyl acetate was added precipitating a small amount of impurity which was discarded. Upon standing crystallization occurred, and 8.7 g. of crystals were collected. Recrystallization gave 7.7 g. of the imidazole salt of reasonable purity. The acid was freed of imidazole, and the resulting gum was stirred with excess ether. Insoluble material was discarded. Upon standing at room temperature 1.66 g. (13%) of 7-(tert-butoxycarbonyl - O - D - phenylglycyl-D-mandelamido)-cephalosporanic acid, identical to that obtained from D-phenylglycine, were deposited. The filtrate was seeded with previously prepared 7-(tert-butoxycarbonyl-O-L-phenylglycyl-D-mandelamido)cephalosporanic acid, and 1.47 g. (11.5%) of crystals of this compound were collected. This material was identical in all respects with that obtained starting from D-phenylglycine.

EXAMPLE 10

7-(tert-butoxycarbonyl-O-β-alanyl-D-mandelamido)-cephalosporanic acid

Example 3 was followed utilizing 1.42 g. (0.0075 mole) tert-butoxycarbonyl-β-alanine and 1.22 g. (0.0075 mole) N,N'-carbonyldiimidazole in 60 ml. dry methylene chloride. After raising the reaction temperature to 40° over a period of an hour, 3.05 g. (0.0075 mole) 7-(D-mandelamido)cephalosporanic acid in 15 ml. of dry ethyl acetate were added. After heating at reflux for 5.5 hr., the reaction mixture was cooled and excess Amberlite IR–120H added. After removal of the resin and drying over anhydrous sodium sulfate, the solution was concentrated to about 10 ml., and ether (ca. 150 ml.) was added. Insoluble material was discarded. Pentane was added to the ether solution to precipitate 2.78 g. (64%) 7-(tert-butoxycarbonyl - O - β-alanyl-D-mandelamido)cephalosporanic acid which was characterized as its sodium salt.

$C_{26}H_{30}N_3NaO_{10}S$ (599.607)

|   | Theory | Found |
|---|---|---|
| C | 52.08 | 52.09 |
| H | 5.04  | 5.07  |
| N | 7.01  | 6.84  |

EXAMPLE 11

7-(O-isonicotinoyl-D-mandelamido)cephalosporanic acid

Example 3 was followed utilizing 1.36 g. (0.011 mole) isonicotinic acid and 1.79 g. (0.011 mole) N,N'-carbonyldiimidazole in 150 ml. dry tetrahydrofuran. The reaction mixture was heated at reflux for 0.25 hr. and allowed to cool to room temperature over 0.75 hr. A solution of 7-(D-mandelamido)cephalosporanic acid (4.06 g., 0.010 mole) in 50 ml. dry tetrahydrofuran was added, and after 1 hr. the reaction was diluted with 100 ml. of anhydrous ether. After 2 days 2.2 g. of white solid were collected and suspended in 180 ml. of water, and a 5 percent solution of sodium bicarbonate was added until a solution was obtained (pH 6.8). After filtration the solution was acidified with 3 N hydrochloric acid to pH 3.5, and the precipitate (1.7 g.) collected. This solid was dissolved in 200 ml. of chloroform and stirred 1 hr. with 100 g. of silica gel. The silica gel was eluted with ethyl acetate. Evaporation of the ethyl acetate left a foam which was caused to solidify by stirring with pentane giving 0.722 g. (14%) of analytically pure 7-(O-isonicotinoyl-D-mandelamido)cephalosporanic acid hemihydrate.

$C_{24}H_{21}N_3O_8S \cdot \tfrac{1}{2}H_2O$ (520.457)

|   | Theory | Found |
|---|---|---|
| C | 55.39 | 55.62 |
| H | 4.34  | 4.52  |
| N | 8.07  | 7.81  |

EXAMPLE 12

7-(O-methoxyacetyl-D-mandelamido)cephalosporanic acid

Example 3 was followed utilizing 0.495 (0.0055 mole) methoxyacetic acid and 0.891 g. (0.0055 mole) N,N'-carbonyldiimidazole in 15 ml. of dry methylene chloride. After 0.75 hr. 2.03 g. (0.0050 mole) 7-(D-mandelamido)cephalosporanic acid in 7 ml. of dry ethyl acetate were added, and the reaction was heated at 35–7° for 2.5 hr. After cooling the reaction mixture was concentrated to ca. 10 ml., and ethyl acetate was added to precipitate 2.29 g. of the imidazole salt. The acid was freed of imidazole, and the resulting gum was treated with an ether-pentane mixture to produce 1.70 g. of solid 7-(O-methoxyacetyl-D-mandelamido)cephalosporanic acid which was purified by conversion to its sodium salt (1.55 g., 62%) using sodium 2-ethylhexanoate in isopropanol.

$C_{21}H_{21}N_2NaO_9S$ (500.471)

|   | Theory | Found |
|---|--------|-------|
| C | 50.40  | 50.17 |
| H | 4.23   | 4.15  |
| N | 5.60   | 5.36  |

EXAMPLE 13

7-(O-p-nitrobenzoyl-D-mandelamido) cephalosporanic acid

Example 3 was followed utilizing 2.67 g. (0.016 mole) p-nitrobenzoic acid and 2.59 g. (0.016 mole) N,N'-carbonyldiimidazole in 30 ml. of dry tetrahydrofuran. The reaction mixture was heated at reflux for 0.5 hr. and then stirred for an additional 0.5 hr. before adding 5.93 g. (0.0145 mole) 7-(D-mandelamido)cephalosporanic acid. After 18 hr. 80 ml. of ethyl acetate were added and a gelatinous material collected which was washed with cold 75% methanolic acetone to give 3.29 g. of the imidazole salt. The salt was dissolved in 50% aqueous acetone with all insoluble material being discarded. The solution was cooled, and 1 N hydrochloric acid was added to lower the pH to about 1.5 and precipitate 7-(O-p-nitrobenzoyl-D-mandelamido)cephalosporanic acid hemihydrate (1.95 g., 24%).

$C_{25}H_{21}N_3O_{10}S \cdot \frac{1}{2}H_2O$ (564.541)

|   | Theory | Found |
|---|--------|-------|
| C | 53.10  | 53.42 |
| H | 3.93   | 3.79  |
| N | 7.44   | 7.31  |

EXAMPLE 14

7-(O-L-methionyl-D-mandelamido) cephalosporanic acid

To an ice-cooled 100 ml. round bottom flask equipped with a calcium sulfate drying tube and magnetic stirring and containing 30 ml. of trifluoroacetic acid was added 3.19 g. (0.0050 mole) 7-(tert-butoxycarbonyl-O-L-methionyl-D-mandelamido)cephalosporanic acid in one portion as a solid. After stirring for 1 hr. the ice bath was removed, and the reaction mixture was allowed to warm to room temperature over 0.5 hr. About one-half of the trifluoroacetic acid was removed under vacuum, and the remaining solution was poured into 400 ml. of dry ether with rapid stirring. The resulting white solid was collected by filtration to give 3.15 g. of the trifluoroacetate salt of 7-(O-L-methionyl-D-mandelamido)cephalosporanic acid. This solid was dissolved in a mixture of 20 ml. $H_2O$ and 5 ml. acetone. Most of the acetone was stripped off under vacuum leaving a gummy residue with the aqueous solution. The residue was removed by filtration. The filtrate was placed in an ice-cooled 50 ml. round bottom flask equipped with magnetic stirring, and the pH of the solution was raised from about 1.5 to about 4.5 by slowly adding a 5% solution of sodium bicarbonate. The mixture was refrigerated 3 days, and the white, crystalline precipitate was collected by filtration and washed with water to give 1.80 g. (65%) of pure 7-(O-L-methionyl-D-mandelamido)cephalosporanic acid hydrate.

$C_{23}H_{27}N_3O_8S_2 \cdot 1H_2O$ (555.641)

|   | Theory | Found |
|---|--------|-------|
| C | 49.72  | 50.02 |
| H | 5.27   | 5.35  |
| N | 7.56   | 7.12  |

EXAMPLE 15

7-(O-D-alanyl-D-mandelamido)cephalosporanic acid

Example 14 was followed utilizing 3.50 g. (0.0061 mole) 7-(tert-butoxycarbonyl-D-alanyl-D-mandelamido) cephalosporanic acid in 38 ml. of trifluoroacetic acid. The trifluoroacetate salt was isolated, dissolved in 15 ml. of water and stirred in the cold with 16 ml. of 25% Amberlite LA-1 (acetate form) ion-exchange resin in methyl isobutyl ketone to give 2.00 g. (67%) 7-(O-D-alanyl-D-mandelamido)cephalosporanic acid hydrate.

$C_{21}H_{23}N_3O_8S \cdot 1H_2O$ (495.521)

|   | Theory | Found |
|---|--------|-------|
| C | 50.90  | 50.99 |
| H | 5.09   | 5.11  |
| N | 8.48   | 8.35  |

EXAMPLE 16

7-(O-L-alanyl-D-mandelamido)cephalosporanic acid

Example 14 was followed utilizing 3.65 g. (0.0063 mole) of 7-(tert-butoxycarbonyl-O-L-alanyl-D-mandelamido)-cephalosporanic acid in 35 ml. of trifluoroacetic acid. The trifluoroacetate salt was isolated, dissolved in 15 ml. of water and stirred in the cold with 15 ml of 25% Amberlite LA-1 (acetate form) ion-exchange resin in methyl isobutyl ketone to give 2.11 g. of solid which was further purified by dissolving in dilute hydrochloride acid and adjusting the pH to 4.0 with 5% sodium bicarbonate solution to give 0.72 g. (23%) 7-(O-L-alanyl-D-mandelamido)cephalosporanic acid hydrate.

$C_{21}H_{23}N_3O_8S \cdot 1H_2O$ (495.521)

|   | Theory | Found |
|---|--------|-------|
| C | 50.90  | 51.20 |
| H | 5.09   | 4.90  |
| N | 8.48   | 8.05  |

EXAMPLE 17

7-(O-D-phenylalanyl-D-mandelamido)cephalosporanic acid

Example 14 was followed utilizing 5.16 g. (0.0079 mole) 7-(tert-butoxycarbonyl-O-D-phenylalanyl-D-mandelamido)cephalosporanic acid in 50 ml. of trifluoroacetic acid. After 1.5 hr. the very hydroscopic trifluoroacetate salt was collected and dissolved in 100 ml. of 30% aqueous acetone. After stirring with excess Amberlite IR-45 ion-exchange resin (acetone washed), the solution was stripped of acetone and the resulting solid collected and carefully washed with acetone to give 0.455 g. (10%) of pure 7-(O-D-phenylalanyl-D-mandelamido)-cephalosporanic acid hydrate.

$C_{27}H_{27}N_3O_8S \cdot 1H_2O$ (571.611)

|   | Theory | Found |
|---|--------|-------|
| C | 56.74  | 56.73 |
| H | 5.11   | 5.24  |
| N | 7.35   | 7.36  |

EXAMPLE 18

7-(O-L-phenylalanyl-D-mandelamido)cephalosporanic acid

Example 14 was followed utilizing 4.84 g. (0.0073 mole) 7-(tert-butoxycarbonyl-O-L-phenylalanyl-D-mandelamido)cephalosporanic acid hemihydrate in 40 ml. of trifluoroacetic acid. After 2.5 hr. the trifluoroacetate salt was isolated, dissolved in acetone and stirred with excess Amberlite IR-45 ion-exchange resin (acetone washed). After removal of the resin and acetone, the resulting gum was stirred with water to cause it to solidify. The solid was washed with acetone to give 1.71 g. (41%) of pure 7-(O-L-phenylalanyl-D-mandelamido)cephalosporanic acid hydrate.

$C_{27}H_{27}N_3O_8S \cdot 1H_2O$ (571.611)

|   | Theory | Found |
|---|--------|-------|
| C | 56.74  | 56.83 |
| H | 5.11   | 5.16  |
| N | 7.35   | 7.03  |

EXAMPLE 19

7-(O-β-alanyl-D-mandelamido)cephalosporanic acid

Example 14 was followed utilizing 2.78 g. (0.0048 mole) 7-(tert-butoxycarbonyl-O-β-alanyl-D-mandelamido)cephalosporanic acid in 25 ml. of trifluoroacetic acid. After 4 hr. the trifluoroacetate salt was isolated, covered with 30 ml. water and treated in the cold with 30 ml. 25% Amberlite LA-1 (acetate form) ion-exchange resin in methyl isobutyl ketone. The layers were separated, and the aqueous phase was washed with methyl isobutyl ketone, concentrated under vacuum and refrigerated. After 10 days crystalline 7-(O-β-alanyl-D-mandelamido)cephalosporanic acid hemihydrate (0.537 g., 23%) was collected.

$C_{21}H_{23}N_3O_8S \cdot \tfrac{1}{2}H_2O$ (486.513)

|   | Theory | Found |
|---|--------|-------|
| C | 51.85  | 51.85 |
| H | 4.97   | 5.28  |
| N | 8.64   | 8.25  |

EXAMPLE 20

7-(O-D-phenylglycyl-D-mandelamido)cephalosporanic acid

Example 14 was followed utilizing 3.23 g. (0.0050 mole) 7 - (tert - butoxycarbonyl-O-D-phenylglycyl-D-mandelamido)cephalosporanic acid in 30 ml. of trifluoroacetic acid. After 1.5 hr. the trifluoroacetate salt was isolated and dissolved in acetone. Water (50 ml.) was added and the acetone removed under vacuum. Insoluble material was discarded. The aqueous solution was cooled, and 5% sodium bicarbonate solution was added slowly to raise the pH to 4.0. After standing under refrigeration for 7 days the solution deposited 1.83 g. (67%) of pure 7-(O-D-phenylglycyl - D - mandelamido)cephalosporanic acid hemihydrate.

$C_{26}H_{25}N_3O_8S \cdot \tfrac{1}{2}H_2O$ (548.584)

|   | Theory | Found |
|---|--------|-------|
| C | 56.93  | 57.00 |
| H | 4.78   | 5.03  |
| N | 7.65   | 7.32  |

EXAMPLE 21

7-(tert-butoxycarbonyl-O-γ-aminobutyryl-D-mandelamido)cephalosporanic acid

Example 3 was followed utilizing 2.23 g. (0.011 mole) tert-butoxycarbonyl-N-aminobutyric acid and 1.79 g. (0.011 mole) N,N'-carbonyldiimidazole in 15 ml. dry p-dioxane. After warming briefly and stirring for 1 hr., a solution of 4.06 g. (0.010 mole) 7-(D-mandelamido)-cephalosporanic acid in 10 ml. p-dioxane was added. After 2 days the reaction mixture was poured into a 1:1 mixture of ether and pentane, and 6.45 g. of solid were isolated. Trituration of the solid with acetone left 2.5 g. of hygroscopic imidazole salt. The acid was freed of imidazole to leave a form which solidified under a 2:1 mixture of pentane and ether to give 1.56 g. (26%) of 7-(tert-butoxycarbonyl - O - γ - aminobutyryl-D-mandelamido)-cephalosporanic acid.

$C_{27}H_{33}N_3O_{10}S$ (591.651)

|   | Theory | Found |
|---|--------|-------|
| C | 54.81  | 54.62 |
| H | 5.62   | 5.74  |
| N | 7.10   | 7.09  |

EXAMPLE 22

7-(O-γ-aminobutyryl-D-mandelamido)cephalosporanic acid

Example 14 was followed utilizing 1.00 g. (0.00169 mole) 7 - (tert-butoxycarbonyl-O-γ-aminobutyryl-D-mandelamido)-cephalosporanic acid in 10 ml. trifluoroacetic acid. After 1 hr. the trifluoroacetate salt was isolated and dissolved in a minimum volume of water and filtered. The cooled aqueous solution was treated with 5% sodium bicarbonate solution to raise the pH to 4.5. After concentration and refrigeration 0.498 g. (58%) of 7-(O-γ-aminobutyryl-D-mandelamido) - cephalosporanic acid hydrate was collected $C_{22}H_{25}N_3O_8 \cdot 1H_2O$ (509.548)

|   | Theory | Found |
|---|--------|-------|
| C | 51.86  | 51.70 |
| H | 5.34   | 5.38  |
| N | 8.25   | 8.16  |

EXAMPLE 23

7-(O-L-phenylglycyl-D-mandelamido)cephalosporanic acid

Example 14 was followed utilizing 1.46 g. (0.0023 mole) 7 - (tert-butoxycarbonyl-O-L-phenylglycyl-D-mandelamido)cephalosporanic acid in 15 ml. trifluoroacetic acid. After 1.5 hr. the trifluoroacetate salt was isolated and dissolved in an acetone-water mixture. The acetone was removed under vacuum, and the resulting insoluble material was discarded. The cooled aqueous solution was treated with 5% sodium bicarbonate solution to raise the pH to 4.5. After concentration and refrigeration 0.485 g. (38%) of 7-(O-L-phenylglycyl-D-mandelamido)cephalosporanic acid hydrate was collected $C_{26}H_{25}N_3O_8S \cdot 1H_2O$ (557.592)

|   | Theory | Found |
|---|--------|-------|
| C | 56.01  | 55.99 |
| H | 4.88   | 4.87  |
| N | 7.54   | 7.18  |

EXAMPLE 24

7-(O-chloroacetyl-D-mandelamido)cephalosporanic acid

Example 3 was followed utilizing 0.520 g. (0.0055 mole) chloroacetic acid and 0.895 g. (0.0055 mole) N,N'-carbonyldiimidazole in 3 ml. dry p-dioxane. After 0.5 hr. 2.03 g. (0.0050 mole) 7 - (D-mandelamido)cephalosporanic acid in 5 ml. dry p-dioxane were added. After 2.5 hr. the reaction mixture was poured into isopropanol, and the imidazole salt (1.48 g.) was collected. The acid was freed of imidazole, and the resulting oil was treated with a 2:1 mixture of pentane and ether to give 0.51 g. (21%) of 7 - (O-chloroacetyl-D-mandelamido)cephalosporanic aid.

$C_{20}H_{19}ClN_2O_8S$ (482.911)

|   | Theory | Found |
|---|--------|-------|
| C | 49.74  | 49.75 |
| H | 3.97   | 4.31  |
| N | 5.80   | 5.49  |

EXAMPLE 25

When the appropriate tert-butoxycarbonyl derivatives of the following listed amino acids are allowed to react with 7-(D-mandelamido)desacetoxycephalosporanic acid in the presence of N,N'-carbonyldiimidazole according to the procedure of Example 3, the corresponding 7-(tert-butoxycarbonyl - O - acyl - D - mandelamido)desacetoxy-cephalosporanic acids are obtained.

valine
leucine
isoleucine

Removal of the tert-butoxycarbonyl group according to the procedure of Example 14 gives the corresponding compounds of Formula I where R is aminoalkyl.

EXAMPLE 26

When the following aromatic aryl carboxylic acids are allowed to react with 7-(D-mandelamido)cephalosporanic acid in the presence of N,N'-carbonyldiimidazole according to the procedure of Example 11, the corresponding 7-(O-aromatic aroyl-D-mandelamido)cephalosporanic acids are obtained.

benzoic acid
o-toluic acid
m-anisic acid
m-chlorobenzoic acid
m-trifluoromethylbenzoic acid
5-methylfuran-2-carboxylic acid
picolinic acid
nicotinic acid

EXAMPLE 27

When the following alkanoic acids are allowed to react with 7-(D-o-chloromandelamido)cephalosporanic acid in the presence of N,N'-carbonyldiimidazole according to the procedure of Example 12, the corresponding 7 - (O-alkanoyl or alkoxyalkanoyl-D - o - chloromandelamido) cephalosporanic acids are obtained.

2-methoxypropionic acid
3-azidopropionic acid
4-bromobutyric acid

EXAMPLE 28

When the following substituted mandelamidocephalosporanic acids are substituted for 7-(D-mandelamido)-cephalosporanic acid in Example 3, and the reaction with tert-butoxycarbonyl-L-methionine carried out as disclosed therein, the corresponding 7 - (tert-butoxycarbonyl-O-L-methionyl - D - substituted mandelamido)cephalosporanic acids are obtained.

7-(D-3,4-dichloromandelamido)cephalosporanic acid
7-(D-4-bromomandelamido)cephalosporanic acid
7-(D-4-chloromandelamido)cephalosporanic acid
7-(D-3-fluoromandelamido)cephalosporanic acid
7-(D-4-nitromandelamido)cephalosporanic acid
7-(D-4-methylmandelamido)cephalosporanic acid
7-(D-4-isopropylmandelamido)cephalosporanic acid
7-(D-3,4-dimethoxymandelamido)cephalosporanic acid
7-(D-4-trifluoromethylmandelamido)cephalosporanic acid
7-(D-3-diethylaminomandelamido)cephalosporanic acid
7-(D-4-butoxymandelamido)cephalosporanic acid Removal of the tert-butoxycarbonyl group according to the procedure of Example 14 gives the corresponding 7-(O-L-methionyl - D - substituted mandelamido)cephalosporanic acids.

EXAMPLE 29

When 3-hydroxymethyl - 7 - aminocephalosporanic acid lactone is substituted for 7-aminocephalosporanic acid in the last part of Example 1, and the procedure described therein carried out, 3-hydroxymethyl-7-(O-azidoacetyl-D-mandelamido)cephalosporanic acid lactone is obtained.

Substitution of 3 - hydroxymethyl-7-D-mandelcephalosporanic acid lactone for 7 - (D-mandelamido)cephalosporanic acid in Examples 3–13, followed by removal of any tert-butoxycarbonyl group that may remain, results in obtaining the corresponding 3 - hydroxymethyl-7-(O-acyl-D-mandelamido)cephalosporanic acid lactone.

EXAMPLE 30

7-(O-methylthioacetyl-D-mandelamido)cephalosporanic acid

Example 3 was followed utilizing 0.585 g. (0.0055 mole) methylthioacetic acid and 0.895 g. (0.0055 mole) N,N'-carbonyldiimidazole in 6 ml. dry p-dioxane. After 35 min. 2.03 g. (0.0050 mole) 7-(D-mandelamido)cephalosporanic acid in 10 ml. p-dioxane were added. After 40 hrs. the reaction mixture was poured into isopropanol and diluted with ether to precipitate 1.84 g. of the crude imidazole salt. The acid was freed of imidazole and then treated in methyl isobutyl ketone with 2.0 ml. 1.4 M sodium 2-ethylhexanoate in isopropanol to precipitate 0.942 g. (36%) of the sodium salt of 7-(O-methylthioacetyl-D-mandelamido)cephalosporanic acid.

$C_{21}H_{21}N_2NaO_8S_2 \cdot \frac{1}{4}H_2O$ (521.041)

|   | Theory | Found |
|---|--------|-------|
| C | 48.41  | 48.33 |
| H | 4.16   | 4.37  |
| N | 5.38   | 5.18  |

EXAMPLE 31

7-(O-phenoxyacetyl-D-mandelamido)cephalosporanic acid

Example 3 was followed utilizing 0.837 g. (0.0055 mole) phenoxyacetic acid and 0.895 g. (0.0055 mole) N,N'-carbonyldiimidazole in 5 ml. dry p-dioxane. After 0.5 hr. 2.03 g. (0.0050 mole) 7-(D-mandelamido)cephalosporanic acid in 10 ml. p-dioxane were added. After 18 hr. the reaction mixture was poured into an ether-pentane (8:1) mixture to give 3.24 g. of imidazole salt. The acid was freed of imidazole and crystallized twice from acetone containing a little water to give 1.79 g. (64%) pure 7-(O-phenoxyacetyl-D-mandelamido)-cephalosporanic acid hydrate.

$C_{26}H_{24}N_2O_9S \cdot 1H_2O$ (558.576)

|   | Theory | Found |
|---|--------|-------|
| C | 55.91  | 56.19 |
| H | 4.69   | 4.76  |
| N | 5.02   | 4.93  |

EXAMPLE 32

7-[O-(β-allyloxypropionyl)-D-mandelamido]cephalosporanic acid

Example 3 was followed utilizing 0.716 g. (0.0055 mole) β-allyloxypropionic acid and 0.895 g. (0.0055 mole) N,N'-carbonyldiimidazole in 8 ml. dry p-dioxane. After 45 min. 2.03 g. (0.0050 mole) 7-(D-mandelamido) cephalosporanic acid in 10 ml. dry p-dioxane were added. After 72 hr. the solvent was poured away from the resulting gum, isopropanol was added to the gum, and the mixture was stirred overnight. A small volume of pentane was added, and 2.08 g. of the crude imidazole salt were collected by filtration. The caid was freed of imidazole and then treated in 50:50 isopropanol-methyl isobutyl ketone solution with 1.4 M sodium 2-ethylhexanoate in isopropanol to give the sodium salt which was recrystallized from 1% aqueous acetone to give 0.466 g. (17%) of sodium 7-[O-(β-allyloxypropionyl)-D-mandelamido] cephalosporanate hydrate.

$C_{24}H_{25}N_2NaO_9S \cdot 1H_2O$ (558.552)

|   | Theory | Found |
|---|--------|-------|
| C | 51.61  | 51.31 |
| H | 4.87   | 4.92  |
| N | 5.02   | 5.19  |

EXAMPLE 33

7-[O-(γ-azidobutyryl)-D-mandelamido]cephalosporanic acid

Example 3 was followed utilizing 0.839 g. (0.0065 mole) γ-azidobutyric acid and 1.053 g. (0.0065 mole) N,N'-carbonyliimidazole in 7 ml. dry p-dioxane. After 35 min. 2.03 g. (0.0050 mole) 7-(D-mandelamido)cephalosporanic acid in 12 ml. dry p-dioxane were added. After 94 hr. the reaction mixture was poured into 250 ml. of isopropanol. The isopropanol insoluble material was dissolved in methanol and treated with charcoal and Amberlite IR–120H. The solvent was removed and the residue was dissolved in 20 ml. methylene chloride and diluted with 60 ml. ether. To this solution was slowly added an excess of 1.4 M sodium 2-ethylhexanoate in isopropanol. The insoluble solid was dissolved in methylene chloride and an equal volume of isopropanol was added. The methylene chloride was slowly stripped off under vacuum and the resulting solid collected by filtration to give 1.09 g. (40%) of sodium 7-[O-(γ-azidobutyryl)-D-mandelamido]cephalosporanate quarter-hydrate.

$C_{22}H_{22}N_5NaO_8S \cdot \frac{1}{4}H_2O$ (544.019)

|   | Theory | Found |
|---|--------|-------|
| C | 48.57  | 48.65 |
| H | 4.17   | 4.22  |
| N | 12.87  | 12.45 |

EXAMPLE 34

7-[O-(2-thenoyl)-D-mandelamido]cephalosporanic acid

Example 3 was followed utilizing 0.704 g. (0.0055 mole) 2-thiophenecarboxylic acid and 0.891 g. (0.0055 mole) N,N'-carbonyldiimidazole in 5 ml. dry tetrahydrofuran. After 0.5 hr. 2.03 g. (0.0050 mole) 7-(D-mandelamido)cephalosporanic acid in 8 ml. tetrahydrofuran were added. After 96 hr. ethyl acetate was added and the crude imidazole salt collected. The salt was dissolved in 250 ml. methanol, and insoluble material was discarded. On concentration to about 50 ml. the methanol solution deposited almost pure product which was freed of imidazole. The acid was dissolved in ethyl acetate, and insoluble materials were discarded. After concentration and refrigeration 0.919 g. (35%) of crystalline 7-[O-(2-thenoyl)-D-mandelamido]cephalosporanic acid hemihydrate was collected.

$C_{23}H_{20}N_2O_8S_2 \cdot \frac{1}{2}H_2O$ (525.569)

|   | Theory | Found |
|---|--------|-------|
| C | 52.56  | 52.47 |
| H | 4.03   | 4.11  |
| N | 5.33   | 5.13  |

EXAMPLE 35

7-[O-(4-methyloxazole-5-carbonyl)-D-mandelamido]cephalosporanic acid

Example 3 was followed utilizing 0.700 g. (0.0055 mole) 4-methyloxazole-5-carboxylic acid and 0.895 g. (0.0055 mole) N,N'-carbonyldiimidazole in 10 ml. dry p-dioxane. After heating to reflux briefly and cooling, 2.03 g. (0.0050 mole) 7-(D-mandelamido)cephalosporanic acid in 20 ml. p-dioxane were added. After 24 hr. the reaction mixture was diluted with ether, and the crude imidazole salt (2.61 g.) was isolated. The acid was freed of imidazole and crystallized from acetone containing a small amount of water to give 0.88 g. (34%) 1-[O-(4-methyloxazole-5-carbonyl) - D-mandelamido]cephalosporanic acid hemihydrate.

$C_{23}H_{21}N_3O_9S \cdot \frac{1}{2}H_2O$ (524.519)

|   | Theory | Found |
|---|--------|-------|
| C | 52.67  | 52.97 |
| H | 4.23   | 4.34  |
| N | 8.01   | 7.78  |

EXAMPLE 36

7-[O-(1,2,3-triazole-4-carbonyl)-D-mandelamido]cephalosporanic acid

Example 3 was followed utilizing 0.622 g. (0.0055 mole) 1,2,3-triazole-4-carboxylic acid and 0.891 g. (0.0055 mole) N,N'-carbonyldiimidazole in 3 ml. dry dimethylformamide. After 45 min. 2.03 g. (0.0050 mole) 7-(D-mandelamido)cephalosporanic acid in 10 ml. dry p-dioxane were added. After 90 hr. 30 ml. of isopropanol were added to the reaction mixture, and the insoluble imidazole salt was isolated. The acid was freed of imidazole using Amberlite IRC-50, treated with charcoal and crystallized from water to give 0.84 g. (34%) of 7-[O-(1,2,3 - triazole - 4 - carbonyl)-D-mandelamido]cephalosporanic acid.

EXAMPLE 37

7-[O-(4-fluorobenzoyl)-D-mandelamido]cephalosporanic acid

Example 3 was followed utilizing 0.770 g. (0.0055 mole) p-fluorobenzoic acid and 0.891 g. (0.0055 mole) N,N'-carbonyldiimidazole in 5 ml. dry tetrahydrofuran. After 1.25 hr. 2.03 g. (0.0050 mole) 7-(D-mandelamido)cephalosporanic acid in 10 ml. dry tetrahydrofuran were added. After 22 hr. 30 ml. tetrahydrofuran were added to the gelatinous reaction mixture and stirring was continued until the gel turned to solid. The solid was collected and freed of imidazole. Crystallization from ether gave 0.995 g. (36%) of 7-[O-(4-fluorobenzoyl)-D-mandelamido]cephalosporanic acid hydrate.

$C_{25}H_{21}FN_2O_8S \cdot 1H_2O$ (546.541)

|   | Theory | Found |
|---|--------|-------|
| C | 54.94  | 55.00 |
| H | 4.24   | 4.37  |
| N | 5.13   | 4.95  |

EXAMPLE 38

7-[O-(4-cyanobenzoyl)-D-mandelamido]cephalosporanic acid

Example 3 was followed utilizing 0.810 g. (0.0055 mole) of 4-cyanobenzoic acid and 0.895 g. (0.0055 mole) N,N'-carbonyldiimidazole in 6 ml. dry p-dioxane. The mixture was heated to 80° until gas evolution ceased. After cooling 2.03 g. (0.0050 mole) 7-(D-mandelamido)cephalosporanic acid in 10 ml. dry p-dioxane were added. After stirring for 48 hr. the reaction mixture was poured into dry ether, and 2.81 g. of the crude imidazole salt were collected. The acid was freed of imidazole and then treated with silica gel to remove colored materials. The resulting solid was recrystallized twice from isopropanol to give 0.166 g. (6%) of 7-[O-(4-cyanobenzoyl)-D-mandelamido]cephalosporanic acid hemihydrate.

$C_{26}H_{21}N_3O_8S \cdot \frac{1}{2}H_2O$ (544.544)

|   | Theory | Found |
|---|--------|-------|
| C | 57.35  | 57.61 |
| H | 4.07   | 4.22  |
| N | 7.72   | 8.02  |

EXAMPLE 39

7-[O-(4-aminobenzoyl)-D-mandelamido]cephalosporanic acid

To a prereduced suspension of 100 mg. of 5% palladium on carbon in 10 ml. of methanol were added 259 mg. (0.00046 mole) 7-[O-(4-nitrobenzoyl)-D-mandelamido]cephalosporanic acid hemihydrate. The mixture was shaken at 50 p.s.i. hydrogen pressure for 1 hr. The catalyst was removed by filtration, and the methanol was removed under vacuum. The residue was taken up in acetone, and the insoluble material was discarded. Ether was added to the acetone solution to precipitate 127 mg. (53%) 7-[O-(4-aminobenzoyl)-D-mandelamido]cephalosporanic acid.

EXAMPLE 40

7-{O-[O-(2,2,2-trichloroethoxycarbonyl)glycoloyl]-D-mandelamido}cephalsporanic acid Example 3 was followed utilizing 2.76 g. (0.011 mole) O-(2,2,2-trichloroethoxycarbonyl)glycolic acid (prepared according to standard procedures) and 2.00 g. (0.012 mole) N,N'-carbonyldiimidazole in 8 ml. dry p-dioxane. After 30 min. 4.06 g. (0.010 mole) 7-(D-mandelamido)cephalosporanic acid in 12 ml. dry p-dioxane were added. After 18 hr. the reaction mixture was poured into a mixture of 100 ml. of isopropanol and 75 ml. ether, and the insoluble imidazole salt (4.45 g.) was collected. The salt was dissolved in 30 ml. of water, covered with 70 ml. ethyl acetate and acidified to pH 2.5 with 3 N hydrochloric acid. The ethyl acetate layer gave on evaporation 2.10 g. (33%) of 7-{O-[O-(2,2,2-trichloroethoxycarbonyl)glycoloyl]-D-mandelamido}cephalosporanic acid.

EXAMPLE 41

7-(O-glycoloyl-D-mandelamido)cephalosporanic acid

A mixture of 100 mg. (0.157 mmole) 7-{O-[O-(2,2,2-trichloroethoxycarbonyl)glycoloyl] - D - mandelamido} cephalosporanic acid and 100 mg. zinc dust in 1 ml. of glacial acetic acid is allowed to stir for 15 hr. The reaction mixture is diluted with 20 ml. of ether, and the insoluble solid is isolated. The solid is allowed to stir in the cold with 2 ml. of pH 2 aqueous hydrochloric acid covered by 10 ml. of ethyl acetate for 2 hr. The aqueous phase is further extracted with ethyl acetate, and the combined extracts are stripped to give 7-(O-glycolyl-D-mandelamido)cephalosporanic acid.

EXAMPLE 42

7-{O-[N,N' - bis - (tert - butoxycarbonyl) - L - lysyl] - D-mandelamido}desacetoxycephalosporanic acid Example 3 is followed utilizing 3.80 g. (0.011 mole) N,N' - bis - (tert - butoxycarbonyl)-L-lysine and 1.78 g. (0.011 mole) N,N'-carbonyldiimidazole in 15 l. dry p-dioxane. After 45 min. 3.48 g. (0.010 mole) 7-(D-mandelamido)desacetoxycephalosporanic acid in 20 ml. dry p-dioxane are added. After 30 hr. the reaction mixture is poured into 500 ml. of dry ether, and the insoluble imidazole salt is isolated. The acid is freed of imidazole, and the resulting material is treated with ether to give solid 7-{O-[N,N'-bis-(tert-butoxycarbonyl)-L-lysyl]-D-mandelamido}desacetoxycephalosporanic acid.

EXAMPLE 43

7-[O-(N - tert - butoxycarbonyl - $\beta$ - tert-butyl-L-aspartoyl)-D-mandelamido]desacetoxycephalosporanic acid Example 3 is followed utilizing 3.18 g. (0.011 mole) N-tert-butoxycarbonyl-L-aspartic acid-$\beta$-tert-butyl ester and 1.78 g. (0.011 mole) N,N'-carbonyldiimidazole in 15 ml. dry p-dioxane. After 45 min. 3.48 g. (0.010 mole) 7-(D-mandelamido)desacetoxycephalosporanic acid in 15 ml. dry p-dioxane are added. After 24 hr. the reaction mixture is poured into a mixture of 350 ml. ether and 50 ml. pentane, and the imidazole salt is isolated. The acid is freed of imidazole, and the resulting material is crystallized from ether giving 7-[O-(N-tert-butoxycarbonyl-$\beta$-tert-butyl-L-aspartoyl)-D-mandelamido]desacetoxycephalosporanic acid.

EXAMPLE 44

7-[O-(N - tert - butoxycarbonyl - L - 2,2-dimethylthiazolidine - 4 - carbonyl) - D-mandelamido]desacetoxycephalosporanic acid Example 3 is followed utilizing 2.87 g. (0.011 mole) N-tert - butoxycarbonyl - L - 2,2 - dimethylthiazolidine-4-carboxylic acid [R. B. Woodward et al., J. Am. Chem. Soc., 88, 852, (1966)] and 1.78 g. (0.011 mole) N,N'-carbonyldiimidazole in 12 ml. dry p-dioxane. After 40 min. 3.48 g. (0.010 mole) 7-(D-mandelamido)desacetoxycephalosporanic acid in 15 ml. dry p-dioxane are added. After 40 hr. the reaction mixture is poured into 450 ml. dry ether, and the imidazole salt is isolated. After being freed of imidazole, the product is crystallized from ether giving 7-[O-(N-tert-butoxycarbonyl-L-2,2-dimethylthiazolidine - 4 - carbonyl) - D - mandelamido]desacetoxycephalosporanic acid.

EXAMPLE 45

7-{O-[N-tert-butoxycarbonyl-O-(2,2,2 - trifluoro - 1 - benzyloxycarbonylaminoethyl) - L - seryl]-D - mandelamido}desacetoxycephalosporanic acid Example 3 is followed utilizing 4.80 g. (0.011 mole) N-tert-butoxycarbonyl-O-(2,2,2 - trifluoro - 1 - benzyloxycarbonylaminoethyl)-L-serine [F. Weygand et al., Chem. Ber. 101, 923 (1968)] and 1.78 g. (0.011 mole) N,N'-carbonyldiimidazole in 20 ml. dry p-dioxane. After 45 min. 3.48 g. (0.010 mole) 7-(D-mandelamido)desacetoxycephalosporanic acid in 15 ml. dry p-dioxane were added. After 30 hr. the reaction mixture is poured into a mixture of 350 ml. of dry ether and 50 ml. of pentane, and the insoluble imidazole salt is isolated. After being freed of imidazole the product is crystallized from an ether-pentane mixture to give 7-{O-[N-tert-butoxycarbonyl-O-(2,2,2-trifluoro - 1 - benzyloxycarbonylaminoethyl)-L-seryl]-D-mandelamido}-desacetoxycephalosporanic acid.

The threonine analog is prepared in the same manner.

EXAMPLE 46

7-[O-(L-lysyl)-D-mandelamido]desacetoxycephalosporanic acid

Example 14 is followed utilizing 3.10 g. (0.0050 mole) 7-{O-[N,N'-bis-(tert-butoxycarbonyl) - L - lysyl]-D-mandelamido}cephalosporanic acid in 50 ml. of trifluoroacetic acid. After 1.5 hr. the trifluoroacetate salt is isolated, dissolved in 20 ml. of water and stirred in the cold with 25 ml. of 25% Amberlite LA–1 (acetate form) ion-exchange resin in methyl isobutyl ketone to precipitate 7-[O-(L-lysyl)-D-mandelamido]-cephalosporanic acid.

EXAMPLE 47

7-[O-(L-$\alpha$-aspartyl)-D-mandelamido]desacetoxycephalosporanic acid

Example 14 is followed utilizing 3.10 g. (0.0050 mole) 7-[O-(N-tert-butoxycarbonyl - $\beta$ - tert-butyl-L-aspartoyl)-D-mandelamido]desacetoxycephalosporanic acid in 50 ml. of trifluoroacetic acid. After 1.5 hr. the trifluoroacetate salt is isolated and treated with one equivalent of aqueous sodium bicarbonate to give 7-[O-(L-$\alpha$-aspartyl)-D-mandelamido]desacetoxycephalosporanic acid.

The glutamic acid analog is prepared in the same manner.

EXAMPLE 48

7-[O-(L-cysteinyl)-D-mandelamido]desacetoxycephalosporanic acid

Example 14 is followed utilizing 2.96 g. (0.0050 mole) 7 - [O - (N - tert - butoxycarbonyl-L-2,2-dimethylthiazolidine - 4 - carbonyl)-D-mandelamido]desacetoxycephalosporanic acid in 30 ml. trifluoroacetic acid. After 2.5 hr. the trifluoroacetate salt is isolated and treated in aqueous solution with 15 ml. of 25% Amberlite LA–1 (acetate form) ion-exchange resin in methyl isobutyl ketone to precipitate 7 - [O - (L-cysteinyl)-D-mandelamido]desacetoxycephalosporanic acid.

EXAMPLE 49

7-[O-(L-seryl)-D-mandelamido]desacetoxycephalosporanic acid

Example 14 is followed utilizing 3.83 g. (0.0050 mole) 7 - {O - [N - tert-butoxycarbonyl-O-(2,2,2-trifluoro-1-benzyloxycarbonylaminoethyl) - L - seryl] - D-mandelamido}desacetoxycephalosporanic acid in a mixture of 50 ml. of trifluoroacetic acid and 5 ml. of anisole containing one equivalent of hydrogen bromide. After 1.5 hr. the hydrobromide salt is isolated and treated in aqueous solution with 15 ml. 25% Amberlite LA–1 (acetate form) ion-exchange resin in methyl isobutyl ketone to precipitate 7 - [O - (L - seryl) - D - mandelamido]desacetoxycephalosporanic acid.

The threonine analog is prepared in the same manner.

EXAMPLE 50

7-[O-cyanocetyl-D-mandelamido]cephalosporanolactone

Example 3 is followed utilizing 0.730 g. (0.010 mole) cyanoacetic acid and 1.62 g. (0.010 mole) N,N'-carbonyldiimidazole in 7 ml. dry dimethylformamide. After 1 hr. 7.73 g. (0.0050 mole) 7-(D-mandelamido)cephalosporanolacetone in 10 ml. dry dimethylformamide are added. After 50 hr. the reaction mixture is poured into 400 ml. of dry ether and the insoluble 7-[O-cyanoacetyl-D-mandelamido]cephalosporanolacetone collected.

EXAMPLE 51

7-(D-mandelamido)-3-methoxymethyl-3-cephem-4-carboxylic acid

A solution of 7.89 g. (0.028 mole) O-dichloroacetyl-D-mandeloyl chloride [British Pat. No. 962,024] in 56 ml. of acetone is added over 40 min. to a cold (−20°) solution of 7.32 g. (0.030 mole) 7-amino-3-methoxymethyl-3-cephem-4-carboxylic acid [Belgian Pat. No. 719,710] in a mixture of 210 ml. of 3% aqueous sodium bicarbonate and 210 ml. of acetone. The solution is allowed to stir at −20° for 1 hr. and then at room temperature for 2 hr. The pH is adjusted to 9.3–9.5 and maintained there for 30 min. by gradual addition of 5% aqueous sodium carbonate. The alkaline solution is extracted with ether. The aqueous phase is cooled to 5° and layered with ethyl acetate, and the pH is adjusted to 1.3 with 6 N hydrochloric acid. The layers are separated, the aqueous layer is extracted again with ethyl aceteate and the combined organic solutions are evaporated in vacuo to give a glassy, amorphous solid. Residual dichloroacetic acid is removed by precipitating the product three times from acetone solution by addition of hexane.

Use of the corresponding 3-ethoxymethyl or 3-butoxymethyl starting material gives the corresponding product.

The product is converted to sodium 7-(D-mandelamido) - 3 - methoxymethyl-3-cephem-4-carboxylate by addition of a 5% solution of methanolic sodium methoxide to a methanol solution of the free acid followed by precipitation with ether. The free acid is obtained by treatment of a methanol solution of the salt with Amberlite IR–120H ion-exchange resin.

EXAMPLE 52

7-[O-(3-pyridylacetyl)-D-mandelamido]-3-methoxymethyl-3-cephem-4-carboxylic acid Example 3 is followed utilizing 0.754 g. (0.0055 mole) 3-pyridylacetic acid and 0.891 g. (0.0055 mole) N,N′-carbonyldiimidazole in 10 ml. dry dimethylformamide. After 45 min. 1.89 g. (0.0050 mole) 7-(D-mandelamido)-3-methoxymethyl-3-cephem-4-carboxylic acid in 10 ml. dry p-dioxane are added. After 60 hr. the reaction mixture is poured into ether, and the insoluble product is stirred with isopropanol. The isopropanol insoluble material is dissolved in wet methanol and treated with Amberlite IRC–50 ion-exchange resin to remove the imidazole. The solvent is stripped in vacuo and the residue triturated with ethyl acetate to leave 7-[O-(3-pyridylacetyl)-D - mandelamido] - 3 - methoxymethyl-3-cephem-4-carboxylic acid.

EXAMPLE 53

7-[O-(1,2,3-triazole-1-acetyl)-D-mandelamido]-3-methoxymethyl-3-cephem-4-carboxylic acid Example 3 is followed utilizing 0.699 g. (0.0055 mole) 1,2,3-triazole-1-acetic acid and 0.891 g. (0.0055 mole) N,N′-carbonyldiimidazole in 8 ml. dry dimethylformamide. After 45 min. 1.89 g. (0.0050 mole) 7-(D-mandelamido)-3-methoxymethyl-3-cephem-4-carboxylic acid in 10 ml. dry p-dioxane are added. After 30 hr. the reaction mixture is poured into ether, and the insoluble material is stirred with isopropanol. The isopropanol insoluble material is dissolved in wet methanol and treated with Amberlite IRC–50 ion-exchange resin to remove the imidazole. The solvent is stripped in vacuo and the residue triturated with ethyl acetate to leave 7-[O-(1,2,3-triazole - 1 - acetyl)-D-mandelamido]-3-methoxymethyl-3-cephem-4-carboxylic acid.

EXAMPLE 54

7-[O-(3-sydnoneacetyl)-D-mandelamido]-3-methoxymethyl-3-cephem-4-carboxylic acid Example 3 is followed utilizing 0.792 g. (0.0055 mole) sydnone-3-acetic acid and 0.891 g. (0.0055 mole) N,N′-carbonyldiimidazole in 10 ml. dry dimethylformamide. After 45 min. 1.89 g. (0.0050 mole) 7-(D-mandelamido)-3-methoxymethyl-3-cephem-4-carboxylic acid in 10 ml dry p-dioxane are added. After 40 hr. the reaction mixture is poured into ether, and the insoluble product is stirred with isopropanol. The isopropanol insoluble material is dissolved in wet methanol and treated with Amberlite IRC–50 ion-exchange resin to remove the imidazole. The solvent is stripped in vacuo and the residue triturated with ethyl acetate to leave 7-[O-(3-sydnoneacetyl) - D - mandelamido]-3-methoxymethyl-3-cephem-4-carboxylic acid.

EXAMPLE 55

7-[O-(N-tert-butoxycarbonyl-δ-aminovaleryl)-D-mandelamido]-3-methoxymethyl-3-cephem-4-carboxylic acid Example 3 is followed utilizing 2.39 g. (0.011 mole) N-tert-butoxycarbonyl-δ-aminovaleric acid and 1.78 g. (0.011 mole) N,N′-carbonyldiimidazole in 8 ml. dry dimethylformamide. After 40 min. 4.00 g. of anhydrous sodium 7-(D-mandelamido)-3-methoxymethyl-3-cephem-4-carboxylate in 20 ml. dry dimethylformamide are added. After 72 hr. the reaction mixture is poured into ether. The insoluble sodium salt is dissolved in methanol and treated with Amberlite IR–120H ion-exchange resin to give the free acid which, after removal of the methanol, is taken up in ether. Insoluble material is discarded. Pentane is added to the ether solution to precipitate 7-[O-(N-tert - butoxycarbonyl - δ - aminovaleryl)-D-mandelamido]-3-methoxymethyl-3-cephem-4-carboxylic acid.

EXAMPLE 56

7-[O-(δ-aminovaleryl)-D-mandelamido]-3-methoxymethyl-3-cephem-4-carboxylic acid

Example 14 is followed utilizing 2.89 g. (0.0050 mole) 7-[O-(N-tert-butoxycarbonyl-δ-aminovaleryl) - D - mandelamido]-3-methoxymethyl-3-cephem-4-carboxylic acid in 35 ml. trifluoroacetic acid. After 1.5 hr. the trifluoroacetate salt is isolated and dissolved in a minimum volume of water containing as little acetone as is necessary to effect solution. Any insoluble material is discarded. The cooled aqueous solution is treated with 5% sodium bicarbonate solution to raise the pH to 4.5. After concentration in vacuo and refrigeration 7-[O-(δ-aminovaleryl)-D-mandelamido] - 3 - methoxymethyl - 3 - cephem-4-carboxylic acid is isolated.

EXAMPLE 57

7-(D-mandelamido)-3-methylthiomethyl-3-cephem-4-carboxylic acid

A solution of 3.95 g. (0.014 mole) O-dichloroacetyl-D-mandeloyl chloride in 28 ml. acetone is added during 30 min. to a solution of 3.90 g. (0.015 mole) 7-amino-3-methylthiomethyl-3-cephem - 4 - carboxylic acid [Belgian Pat. No. 734,532] in a mixture of 100 ml. of 3% aqueous sodium bicarbonate and 100 ml. acetone while maintaining the temperature at −20°. When the addition is complete, the solution is allowed to stir at −20° for 1 hr. and then at room temperature for 2 hr. A solution of 5% aqueous sodium carbonate is added gradually until the pH of the reaction solution is raised to 9.3–9.5 and maintained there for 30 min. The alkaline solution is then extracted with ether. The aqueous phase is cooled to 5° and layered with ethyl acetate, and then the pH is adjusted to 1.5 with 6 N hydrochloric acid. Evaporation of the dried ethyl acetate layer in vacuo gives the desired cephalosporanic acid as a foam. Following hexane precipitation of the crude acid from acetone three times, it is converted with methanolic sodium methoxide to sodium 7-(D-mandelamido)-3-methylthiomethyl-3-cephem-4-carboxylate. The free acid is obtained by treatment of a methanolic solution of the salt with Amberlite IR–120H ion-exchange resin.

Use of a 3-ethylthiomethyl or 3-butylthiomethyl starting material gives the corresponding product.

EXAMPLE 58

7-[O-(β-tert-butoxycarbonylpropionyl)-D-mandelamido]-3-methylthiomethyl-3-cephem-4-carboxylic acid Example 3 is followed utilizing 1.91 g. (0.011 mole) β-tert-butoxycarbonylpropionic acid and 1.78 g. (0.011 mole) N,N'-carbonyldiimidazole in 10 ml. dry p-dioxane. After 45 min. 3.94 g. (0.010 mole) 7-(D-mandelamido)-3-methylthiomethyl-3-cephem-4-carboxylic acid in 15 ml. dry p-dioxane are added. After 60 hr. the reaction mixture is poured into ether to precipitate the insoluble imidazole salt. The acid is freed of imidazole and taken up in ether containing a little methylene chloride. Insoluble material is discarded. Pentane is added to precipitate 7-[O-(β - tert - butoxycarbonylpropionyl) - D - mandelamido]-3-methylthiomethyl-3-cephem-4-carboxylic acid.

EXAMPLE 59

7-[O-(β-carboxypropionyl)-D-mandelamido]-3-methylthiomethyl-3-cephem-4-carboxylic acid Example 14 is followed utilizing 2.75 g. (0.0050 mole) 7-[O-(β - tert - butoxycarbonylpropionyl) - D - mandelamido]-3-methylthiomethyl-3-cephem - 4 - carboxylic acid in 35 ml. trifluoroacetic acid. After 1.5 hr. the reaction mixture is poured into 500 ml. dry ether, and the insoluble 7-[O-(β-carboxypropionyl)-D-mandelamido]-3-methylthiomethyl-3-cephem-4-carboxylic acid is isolated.

EXAMPLE 60

7-{O-[4-(2,2,2 - trichloroethoxycarbonyloxy)benzoyl]-D-mandelamido} - 3 - methylthiomethyl-3-cephem-4-carboxylic acid Example 3 is followed utilizing 3.45 g. (0.11 mole) 4-(2,2,2-trichloroethoxycarbonyloxy)benzoic acid (prepared by standard procedures) and 1.78 g. (0.011 mole) N,N'-carbonyldiimidazole in 12 ml. dry p-dioxane. After 45 min. 3.94 g. (0.010 mole) 7-(D-mandelamido)-3-methylthiomethyl-3-cephem-4-carboxylic acid in 12 ml. dry p-dioxane are added. After 50 hr. the reaction mixture is poured into 400 ml. ether and the insoluble imidazole salt isolated. The acid is freed of imidazole and taken up in ether. Insoluble material is discarded. Pentane is added to the ether solution to precipitate 7-{O-[4-(2,2,2-trichloroethoxycarbonyloxy)benzoyl] - D-mandelamido}-3-methylthiomethyl-3-cephem-4-carboxylic acid.

EXAMPLE 61

7-[O-(4-hydroxybenzoyl)-D-mandelamido]-3-methylthiomethyl-3-cephem-4-carboxylic acid A mixture of 3.45 g. (0.0050 mole) 7-{O-[4-(2,2,2-trichloroethoxycarbonyloxy)benzoyl] - D-mandelamido}-3-methylthiomethyl-3-cephem-4-carboxylic acid and 3.50 g. zinc dust in 40 ml. of 10% aqueous acetic acid is allowed to stir for 2 hr. The solid material is collected and stirred in the cold for 2 hr. with 40 ml. pH 2 aqueous hydrochloric acid covered with 40 ml. of ethyl acetate. The aqueous phase is added to the aqueous acetic acid filtrate and extracted with ethyl acetate. The combined ethyl acetate extracts are dried and stripped to dryness. The residue is triturated with ether to give 7-[O-(4-hydroxybenzoyl) - D - mandelamido]-3-methylthiomethyl-3-cephem-4-carboxylic acid.

EXAMPLE 62

7-(D-mandelamido)-3-pyridinomethyl-3-cephem-4-carboxylic acid

A solution of 2.0 g. (4.6 mmol) of 7-(D-mandelamido)-cephalosporanic acid monomethanolate in a mixture of 12 ml. of water and 0.7 ml. of pyridine was heated at 60° for 20 hr. The solution was diluted with 10 ml. of water and the pH was adjusted to 3.8 with glacial acetic acid. The syrup which resulted after evaporation of the solvent in vacuo was triturated with acetone to give 1.25 g. of air-dried product. This material was dissolved in 30 ml. of warm water, and the solution was extracted with ethyl acetate. The aqueous layer was adjusted to pH 2.0 with dilute sulfuric acid and then extracted with ethyl acetate. The pH of the aqueous layer was adjusted to 4.0 with aqueous barium hydroxide, filtered and concentrated to a syrup in vacuo at 45–50°. Trituration with acetone gave 0.75 g. of off-white product which was then dissolved in 6:1 acetonitrile-water. The mixture was filtered, concentrated in vacuo and diluted with acetone to give 0.60 g. (27%) 7-(D-mandelamido)-3-pyridinomethyl-3-cephem-4-carboxylic acid.

$C_{21}H_{19}N_3O_5S \cdot 3H_2O$ (479.527)

|   | Theory | Found |
|---|--------|-------|
| C | 52.60  | 52.33 |
| H | 5.26   | 5.34  |
| N | 8.76   | 8.91  |

EXAMPLE 63

7-(O-acetoxyacetyl-D-mandelamido)-3-pyridinomethyl-3-cephem-4-carboxylic acid

Example 3 is followed utilizing 1.18 g. (0.010 mole) acetoxyacetic acid and 1.62 g. (0.010 mole) N,N'-carbonyldiimidazole in 5 ml. dry dimethylformamide. After 35 min. 2.13 g. (0.0050 mole) 7-(D-mandelamido)-3-pyridinomethyl-3-cephem-4-carboxylic acid in 15 ml. dry dimethylformamide are added. After 40 hr. the reaction mixture is poured into ether, and the insoluble material is triturated with isopropanol to leave 7-(O-acetoxyacetyl - D - mandelamido)-3-pyridinomethyl-3-cephem-4-carboxylic acid.

EXAMPLE 64

7-(O-phenylacetyl-D-mandelamido)-3-pyridinomethyl-3-cephem-4-carboxylic acid

Example 3 is followed utilizing 1.36 (0.010 mole) phenylacetic acid and 1.62 g. (0.010 mole) N,N'-carbonyldiimidazole in 5 ml. dry dimethylformamide. After 35 min. 2.13 g. (0.0050 mole) 7-(D-mandelamido)-3-pyridinomethyl-3-cephem-4-carboxylic acid in 15 ml. dry dimethylformamide are added. After 80 hr. the reaction mixture is poured into ether, and the insoluble material is triturated with isopropanol to leave 7-(O-phenylacetyl-D - mandelamido) - 3 - pyridinomethyl-3-cephem-4-carboxylic acid.

We claim:

1. A compound of the formula

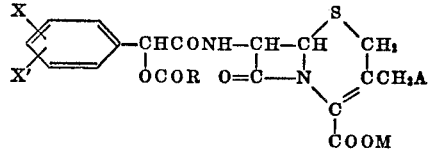

wherein:

X and X' are each hydrogen, lower alkyl of 1–4 carbon atoms, lower alkoxy of 1–4 carbons, halo, trifluoromethyl, nitro, or dilower alkylamino of 2–8 carbon atoms;

A is hydrogen, acetoxy, pyridinium, lower alkoxy of 1–4 carbon atoms, lower alkylthio of 1–4 carbon atoms, or, when taken together with M, a carbon-oxygen bond;

M is hydrogen, a pharmaceutically acceptable cation, an anionic charge, or, when taken together with A, a carbon-oxygen bond; and R is aminoalkyl of 1 to 8 carbon atoms where said alkyl group may be branched or straight chain and may be unsubstituted or substituted with one or more hydroxy, mercapto, methylthio, carboxy, amino, or phenyl groups;

substituted alkyl where said alkyl group may have 1 to 8 carbon atoms and be branched or straight chain and the substituent may be lower alkoxy of 1–4 carbon atoms, hydroxy, allyloxy, lower alkylthio of 1–4 carbon atoms, azido, halo, cyano, carboxy, acetoxy, or phenoxy;

phenyl which may be unsubstituted or substituted with lower alkyl or lower alkoxy of 1–4 carbon atoms, halo, nitro, trifluoromethyl, hydroxy, amino, cyano, or dilower alkylamino of 2–8 carbon atoms;

monocyclic heterocyclic aryl which may be unsubstituted or substituted with methyl;

benzyl; or monocyclic heterocyclic aralkyl where the said alkyl group may be of 1–4 carbon atoms.

2. A compound as claimed in claim 1, where A is hydrogen, methoxy, or acetoxy and M is hydrogen.

3. A compound as claimed in claim 2, being the compound 7-(O-azidoacetyl-D-mandelamido)cephalosporanic acid.

4. A compound as claimed in claim 2, being the compound 7-(O-glycyl-D-mandelamido)cephalosporanic acid.

5. A compound as claimed in claim 2, being the compound 7-(O-methoxyacetyl-D-mandelamido)cephalosporanic acid.

6. A compound as claimed in claim 2, being the compound 7-(O-β-alanyl - D - mandelamido)cephalosporanic acid.

7. A compound as claimed in claim 2, being the compound 7-(O-L-alanyl - D - mandelamido)cephalosporanic acid.

8. A compound as claimed in claim 2, being the compound 7-(O-D-phenylalanyl - D - mandelamido)cephalosporanic acid.

9. A compound as claimed in claim 2, being the compound 7-(O-D-phenylglycyl - D - mandelamido)cephalosporanic acid.

10. A compound as claimed in claim 2, being the compound 7-(O-L-methionyl - D - mandelamido)cephalosporanic acid.

11. A compound as claimed in claim 2, being the compound 7-(O-γ-aminobutyryl - D - mandelamido)cephalosporanic acid.

12. A compound as claimed in claim 2, being the compound 7-(O-chloroacetyl - D - mandelamido)cephalosporanic acid.

13. A compound as claimed in claim 2, being the compound 7-(O-2-thenoyl-D-mandelamido)cephalosporanic acid.

14. A compound as claimed in claim 2, being the compound 7-(O-glycolyl - D - mandelamido)cephalosporanic acid.

15. A compound of the formula

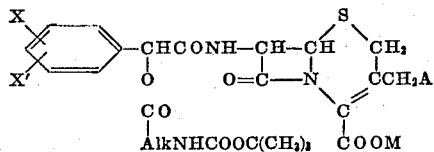

wherein:

X and X' are each hydrogen, lower alkyl of 1–4 carbon atoms, lower alkoxy of 1–4 carbon atoms, halo, trifluoromethyl, nitro, or dilower alkylamino of 2–8 carbon atoms;

A is hydrogen, lower alkanoyloxy of 2–8 carbon atoms, pyridinium, lower alkoxy of 1–4 carbon atoms, lower alkylthio of 1–4 carbon atoms, or, when taken together with M, a carbon-oxygen bond;

M is hydrogen, a pharmaceutically acceptable cation, an anionic charge, or, when taken together with A, a carbon-oxygen bond; and Alk is a straight or branched chain alkyl group which may be unsubstituted or substituted with hydroxy, mercapto, methylthio, carboxy, amino, or phenyl.

16. A compound as claimed in claim 15, where A is hydrogen, methoxy, or acetoxy and M is hydrogen.

17. A compound as claimed in claim 16, being the compound 7-(tert-butoxycarbonyl-O-γ-aminobutyryl - D-mandelamido)cephalosporanic acid.

18. A compound as claimed in claim 16, being the compound 7-(tert-butoxycarbonyl-O-β-alanyl - D - mandelamido)-cephalosporanic acid.

19. A compound as claimed in claim 16, being the compound 7-(tert-butoxycarbonyl-O-D-phenylglycyl - D-mandelamido)cephalosporanic acid.

20. A compound as claimed in claim 16, being the compound 7-(tert-butoxycarbonyl-O-D-phenylalanyl - D-mandelamido)cephalosporanic acid.

21. A compound as claimed in claim 16, being the compound 7-(tert-butoxycarbonyl-O-D-alanyl-D-mandelamido)cephalosporanic acid.

22. A compound as claimed in claim 16, being the compound 7 - (tert - butoxycarbonyl-O-L-methionyl-D-mandelamido)cephalosporanic acid.

References Cited

UNITED STATES PATENTS 3,592,812  7/1971  Alburn et al. _____ 260—243 C

OTHER REFERENCES

Reference "A" cited to indicate state of art only.

NICHOLAS S. RIZZO, Primary Examiner.

U.S. Cl. X.R.

424—246